United States Patent
Xu et al.

(10) Patent No.: US 11,306,622 B2
(45) Date of Patent: Apr. 19, 2022

(54) COAL FIRED POWER GENERATION SYSTEM AND SUPERCRITICAL CO2 CYCLE SYSTEM THEREOF

(71) Applicant: North China Electric Power University, Beijing (CN)

(72) Inventors: Jinliang Xu, Beijing (CN); Enhui Sun, Beijing (CN); Jian Xie, Beijing (CN); Chao Liu, Beijing (CN); Hangning Li, Beijing (CN); Huan Liu, Beijing (CN); Guanglin Liu, Beijing (CN)

(73) Assignee: North China Electric Power University, Beijing (CN)

( * ) Notice: Subject to any disclaimer, the term of this patent is extended or adjusted under 35 U.S.C. 154(b) by 22 days.

(21) Appl. No.: 17/039,599

(22) Filed: Sep. 30, 2020

(65) Prior Publication Data
US 2021/0381399 A1   Dec. 9, 2021

(30) Foreign Application Priority Data

Jun. 8, 2020 (CN) .......................... 202010512983.2

(51) Int. Cl.
*F01K 7/32* (2006.01)
*F01K 7/22* (2006.01)
(Continued)

(52) U.S. Cl.
CPC .................. *F01K 7/32* (2013.01); *F01K 7/22* (2013.01); *F01K 25/103* (2013.01); *F02C 1/05* (2013.01);
(Continued)

(58) Field of Classification Search
CPC . F01K 25/103; F01K 7/32; F01K 7/22; F02C 1/04; F02C 1/05; F02C 1/10; F02C 1/105; F05D 2210/12; F05D 2220/31
See application file for complete search history.

(56) References Cited

U.S. PATENT DOCUMENTS

| 4,576,008 A | 3/1986 | Silvestri, Jr. |
| 10,309,262 B2 | 6/2019 | Bak et al. |

(Continued)

FOREIGN PATENT DOCUMENTS

| CN | 206144671 U | 5/2017 |
| CN | 108036295 A | 5/2018 |

(Continued)

OTHER PUBLICATIONS

First Chinese Office Action regarding Application No. 202010512983.2 dated Mar. 10, 2021. English translation provided by Unitalen Attorneys at Law.

(Continued)

*Primary Examiner* — Mark A Laurenzi
*Assistant Examiner* — Xiaoting Hu
(74) *Attorney, Agent, or Firm* — Harness, Dickey & Pierce, P.L.C.

(57) ABSTRACT

A coal-fired power generation system and a supercritical $CO_2$ cycle system thereof are provided. The supercritical $CO_2$ cycle system includes a compressor unit and a turbine unit. The turbine unit includes a preceding stage heater, a preceding stage turbine, a last stage heater and a last stage turbine successively connected in series. An exhaust port of at least one of compressors in the compressor unit is in communication with the turbine unit through a split flow pipe, and a communication position between the split flow pipe and the turbine unit is located downstream of a suction port of the preceding stage turbine. An auxiliary regenerator and an auxiliary heater are provided at the split flow pipe, and the auxiliary regenerator is located upstream of the auxiliary heater.

20 Claims, 4 Drawing Sheets

(51) Int. Cl.
    *F01K 25/10*     (2006.01)
    *F02C 1/05*     (2006.01)

(52) U.S. Cl.
    CPC ...... *F05D 2210/12* (2013.01); *F05D 2220/31* (2013.01)

(56) References Cited

U.S. PATENT DOCUMENTS

| | | | | |
|---|---|---|---|---|
| 2012/0216536 | A1* | 8/2012 | Ma | F03G 6/00 60/641.8 |
| 2013/0033044 | A1* | 2/2013 | Wright | F02C 1/10 290/1 R |
| 2016/0003108 | A1* | 1/2016 | Held | F01K 23/12 60/517 |
| 2016/0010513 | A1* | 1/2016 | Kang | F01K 25/10 60/671 |
| 2016/0305289 | A1* | 10/2016 | Hwang | F01K 11/02 |

FOREIGN PATENT DOCUMENTS

| | | | |
|---|---|---|---|
| CN | 108071430 | A | 5/2018 |
| CN | 108105747 | A | 6/2018 |
| CN | 108661735 | A * | 10/2018 |
| CN | 108678822 | A * | 10/2018 |
| CN | 208380647 | U | 1/2019 |
| CN | 111005780 | A * | 4/2020 |
| WO | WO-2012074911 | A2 | 6/2012 |

OTHER PUBLICATIONS

Hu, Han et al., "Conceptual Design of Supercritical CO2Coal Fired Boiler Cooling Wall in Split-Flow Mode," Chinese Society for Electrical Engineering, vol. 39, No. 22; Nov. 20, 2019, pp. 6656-6665.

Jia, Sun, "Characteristic Simulation and Control of Supercritical Carbon Dioxide Cycle Power Generation System," Harbin Institute of Technology, School of Energy Science & Engineering; Jun. 2018.

\* cited by examiner

COAL FIRED POWER GENERATION SYSTEM AND SUPERCRITICAL CO2 CYCLE SYSTEM THEREOF

CROSS REFERENCE TO RELATED APPLICATIONS

This application claims the priority to Chinese Patent Application No. 202010512983.2 titled "COAL-FIRED POWER GENERATION SYSTEM AND SUPERCRITICAL $CO_2$ CYCLE SYSTEM THEREOF", filed with the China National Intellectual Property Administration on Jun. 8, 2020, which is incorporated herein by reference in its entirety.

FIELD

The present application relates to the technical field of coal-fired power generation, and in particular to a coal-fired power generation system and supercritical $CO_2$ (carbon dioxide) cycle system thereof.

BACKGROUND

The supercritical carbon dioxide power generation system is gradually popularized due to advantages of high efficiency, small size, light weight and low noise. At present, the supercritical carbon dioxide Brayton cycle (supercritical $CO_2$ cycle) is employed in the supercritical carbon dioxide power generation system. However, there are two main problems in the application of the supercritical carbon dioxide power generation system, i.e. a large pressure drop of the boiler and the residual heat to be absorbed.

Specifically, an atmospheric pressure it-type or tower type boiler is generally used for a steam Rankine cycle coal-fired unit. If the supercritical $CO_2$ cycle coal-fired unit still employs the above pulverized coal-fired boiler, and the heating surface structure and layout of the boiler remain unchanged, specifically, the furnace of the boiler is heated by using a cooling wall, and a preceding stage heater of the turbine units and a last stage heater of a part of the turbine units are located in the furnace, in this case, the problem of a large pressure drop of the boiler will be caused. The root cause of this problem is that when the same unit capacity is provided, compared with the steam Rankine cycle, the mass flow of the working medium of the supercritical $CO_2$ cycle increases 6 to 8 times, and if the structure of the boiler remains unchanged, the resistance of the boiler increases due to the increased mass flow, and thus the pressure drop of the boiler increases.

For the steam Rankine cycle, when the unit is a double reheat supercritical unit, the water temperature at the inlet of the economizer is about 340° C. In this case, the residual heat energy of the flue gas can be fully absorbed by the air preheater. However, for the supercritical $CO_2$ cycle, provided with the same temperature and pressure parameters of the main steam, the minimum temperature of $CO_2$ entering into the boiler in the recompression cycle is about 410° C. When the double reheat arrangement is employed in the cycle, the minimum temperature of $CO_2$ entering into the boiler is about 510° C. In this case, if the exhaust gas temperature and air temperature of the boiler remain unchanged, there is residual heat to be absorbed in the tail flue of the boiler of the supercritical $CO_2$ unit. If the residual heat cannot be effectively absorbed, the heat discharged from the boiler to the environment is increased, thus the boiler efficiency is reduced, and thereby the total efficiency of the thermal system is reduced.

In summary, the technical problem to be addressed by those skilled in the art is to provide a supercritical $CO_2$ cycle system of a coal-fired power generation system, to decrease the resistance of the boiler and reduce the pressure drop of the boiler, and improve the boiler efficiency.

SUMMARY

An object of the present application is to provide a supercritical $CO_2$ cycle system of a coal-fired power generation system, so as to decrease resistance of a boiler, reduce a pressure drop of the boiler, optimize a cycle process and improve the efficiency. Another object of the present application is to provide a coal-fired power generation system having the supercritical $CO_2$ cycle system.

To achieve the above objects, technical solutions are provided as follows according to the present application.

A supercritical $CO_2$ cycle system of a coal-fired power generation system includes a compressor unit and a turbine unit, wherein the turbine unit includes a preceding stage heater, a preceding stage turbine, a last stage heater and a last stage turbine successively connected in series. An exhaust port of at least one of compressors in the compressor unit is in communication with the turbine unit through a split flow pipe, and a communication position between the split flow pipe and the turbine unit is located downstream of a suction port of the preceding stage turbine; and an auxiliary regenerator and an auxiliary heater are provided on the split flow pipe, and the auxiliary regenerator is located upstream of the auxiliary heater.

Preferably, the communication position between the split flow pipe and the turbine unit is located at an intermediate stage expansion inlet of the preceding stage turbine.

Preferably, the preceding stage turbine is in communication with the last stage heater through a turbine pipe, and the split flow pipe is in communication with the turbine pipe.

Preferably, the turbine unit further includes a plurality of intermediate stage heaters and a plurality of intermediate stage turbines connected in series between the preceding stage turbine and the last stage heater, and each of the intermediate stage heaters is arranged upstream of one of the plurality of intermediate stage turbines which is adjacent to the intermediate stage heater.

Preferably, the preceding stage turbine is in communication with one of the plurality of intermediate stage heaters which is adjacent to the preceding stage turbine through a first turbine pipe section, and the last stage heater is in communication with one of the plurality of intermediate stage turbines which is adjacent to the last stage heater through a second turbine pipe section; and the split flow pipe is in communication with the first turbine pipe section, or the split flow pipe is in communication with the second turbine pipe section.

Preferably, the communication position between the split flow pipe and the turbine unit is located at an intermediate stage expansion inlet of one of the plurality of intermediate stage turbines.

Preferably, at least two intermediate stage turbines and two intermediate stage heaters are provided, each of the intermediate stage turbines is in communication with one of the plurality of intermediate stage heaters which is adjacent to the intermediate stage turbine through a third turbine pipe section, and the split flow pipe is in communication with the third turbine pipe section.

Preferably, a turbine exhaust pipe is arranged at an exhaust port of the last stage turbine, the compressor unit includes at least two compressors in communication with the turbine exhaust pipe, and in a flow direction in the turbine exhaust pipe, an exhaust port of one of the compressors which is located most upstream is in communication with the turbine unit through the split flow pipe.

Preferably, a turbine exhaust pipe is arranged at an exhaust port of the last stage turbine, a low pressure side pipe section of the auxiliary regenerator is connected in series with the turbine exhaust pipe, and a high pressure side pipe section of the auxiliary regenerator is connected in series with the split flow pipe.

Preferably, the supercritical $CO_2$ cycle system of the coal-fired power generation system further includes a regenerative unit. The regenerative unit includes a plurality of regenerators, and the auxiliary regenerator and one of the plurality of regenerators form an integral structure.

In the supercritical $CO_2$ cycle system of the coal-fired power generation system according to the present application, since the exhaust port of at least one of the compressors is in communication with the turbine unit through the split flow pipe, and the communication position between the split flow pipe and the turbine unit is located downstream of the suction port of the preceding stage turbine, the gas discharged from at least one of the compressors will directly reach downstream of the suction port of the preceding stage turbine through the split flow pipe, that is, the downstream of the preceding stage heater, which reduces the mass flow of the gas entering into the preceding stage heater. Since the boiler employs a wall surface heating manner, the preceding stage heater is arranged inside the boiler furnace, the flow in the preceding stage heater directly determines the boiler resistance. Specifically, the greater the flow in the preceding stage heater, the greater the boiler resistance. Therefore, the boiler resistance is effectively reduced by reducing the mass flow of the gas entering into the preceding stage heater, thereby reducing the boiler pressure drop.

Based on the above supercritical $CO_2$ cycle system, a coal-fired power generation system is further provided according to the present application. The coal-fired power generation system includes the supercritical $CO_2$ cycle system according to any one of the above solutions.

Preferably, a low pressure side pipe section of the auxiliary regenerator is arranged in parallel with a low pressure side pipe section of the high temperature regenerator of the regenerative unit;

the preceding stage heater includes a preceding stage heater body and a main flue gas cooler; in a flow direction in a turbine inlet pipe, the main flue gas cooler is located upstream of the preceding stage heater body; and the coal-fired power generation system comprises a flue gas device, and the flue gas device includes the main flue gas cooler; wherein the flue gas device further comprises a first auxiliary flue gas cooler, wherein an inlet of the first auxiliary flue gas cooler is in communication with a high pressure side inlet of the high temperature regenerator of the regenerative unit, and an outlet of the first auxiliary flue gas cooler is in communication with an inlet of the main flue gas cooler; and/or, the flue gas device further includes a second auxiliary flue gas cooler and the auxiliary heater, wherein an inlet of the second auxiliary flue gas cooler is in communication with the split flow pipe at a position located upstream of the auxiliary regenerator, and an outlet of the second auxiliary flue gas cooler is in communication with an inlet of the auxiliary heater.

BRIEF DESCRIPTION OF THE DRAWINGS

For more clearly illustrating embodiments of the present application or the technical solutions in the conventional technology, drawings referred to describe the embodiments or the conventional technology will be briefly described hereinafter. Apparently, the drawings in the following description are only some examples of the present application, and for those skilled in the art, other drawings may be obtained based on these drawings without any creative efforts.

DETAILED DESCRIPTION OF THE EMBODIMENTS

The technical solution according to the embodiments of the present application will be described clearly and completely as follows in conjunction with the accompany drawings in the embodiments of the present application. It is obvious that the described embodiments are only a part of the embodiments according to the present application, rather than all of the embodiments. All the other embodiments obtained by those skilled in the art based on the embodiments in the present application without any creative work belong to the scope of protection of the present application.

Figure 1:
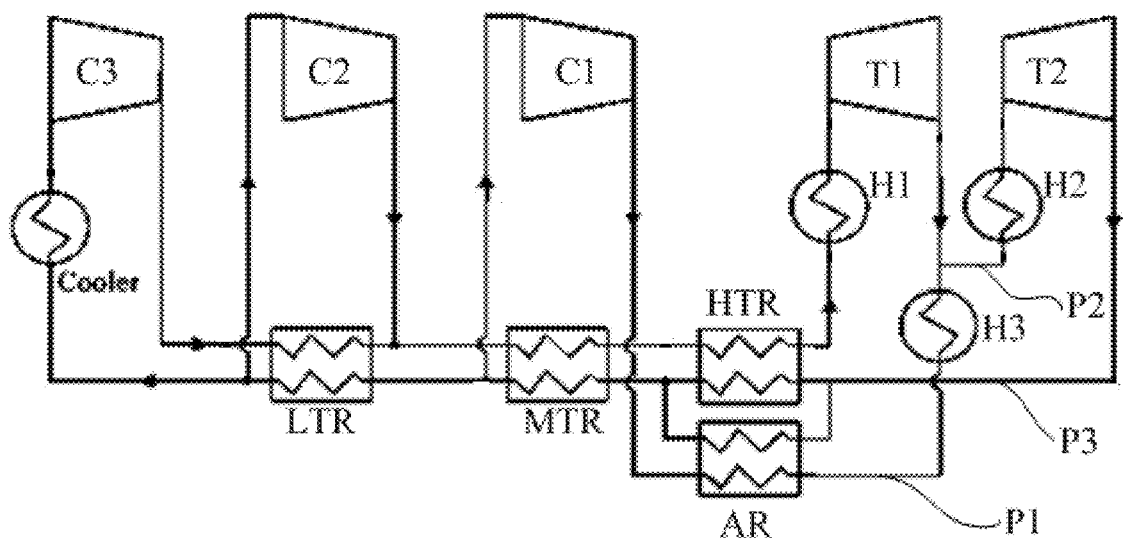
FIG. 1 is a cycle flow chart of a supercritical $CO_2$ cycle system of a coal-fired power generation system according to an embodiment of the present application.
Figure 2:
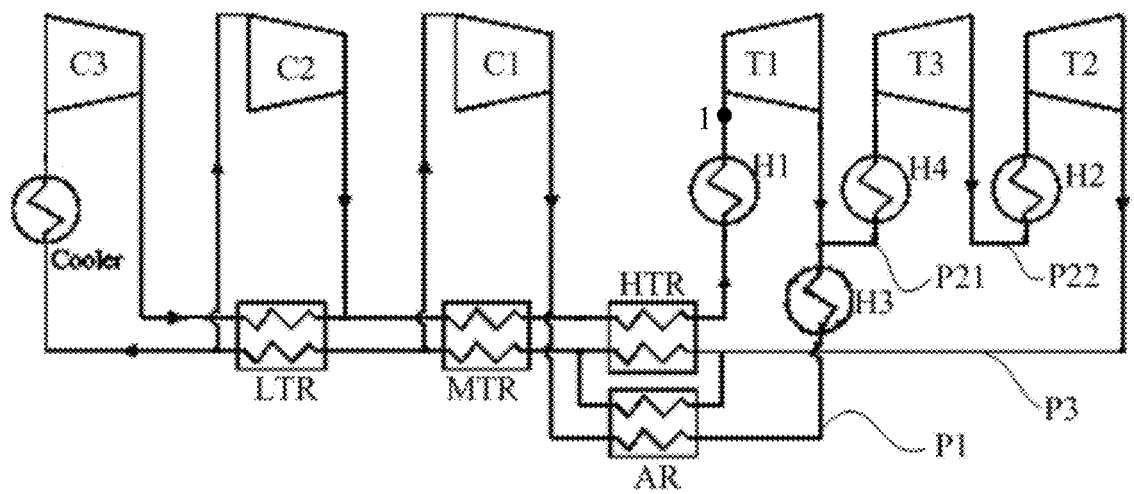
FIG. 2 is another cycle flow chart of the supercritical $CO_2$ cycle system of the coal-fired power generation system according to the embodiment of the present application.
Figure 3:
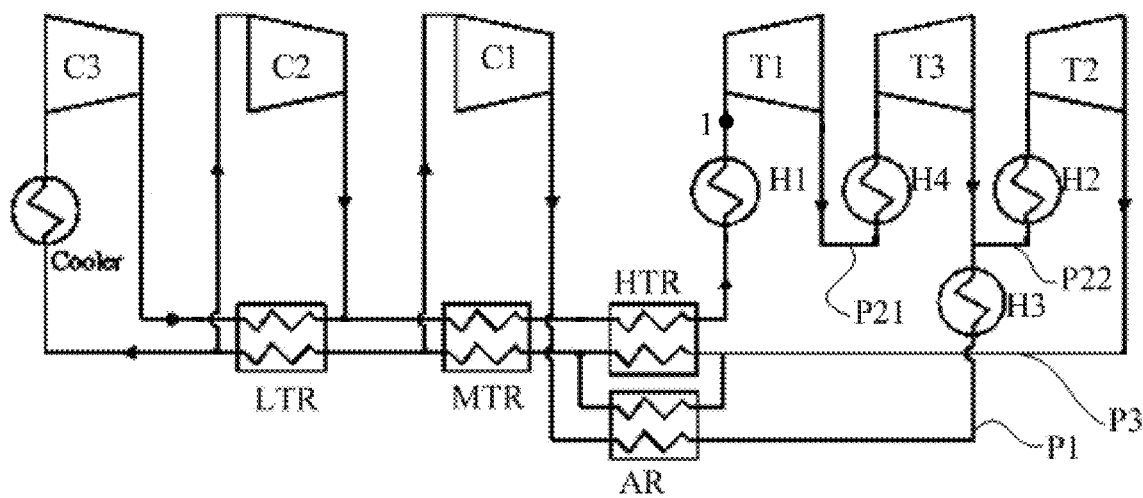
FIG. 3 is yet another cycle flow chart of the supercritical $CO_2$ cycle system of the coal-fired power generation system according to the embodiment of the present application.

As shown in FIGS. 1 to 3, a supercritical $CO_2$ cycle system of a coal-fired power generation system according to an embodiment of the present application includes a compressor unit and a turbine unit.

The turbine unit includes a preceding stage heater H1, a preceding stage turbine T1, a last stage heater H2 and a last stage turbine T2 successively connected in series. An exhaust port of at least one of compressors in the compressor unit is in communication with the turbine unit through a split flow pipe P1, and a communication position between the split flow pipe P1 and the turbine unit is located downstream of a suction port of the preceding stage turbine T1. An auxiliary regenerator AR and an auxiliary heater H3 are provided on the split flow pipe P1, and the auxiliary regenerator AR is located upstream of the auxiliary heater H3.

With the auxiliary regenerator AR and the auxiliary heater H3 provided according to the above solution, a gas flowing into the turbine unit through the split flow pipe P1 is ensured to meet the requirement.

In the supercritical $CO_2$ cycle system of the coal-fired power generation system according to the embodiment of the present application, since the exhaust port of at least one of the compressors is in communication with the turbine unit through the split flow pipe, and the communication position between the split flow pipe and the turbine unit is located downstream of the suction port of the preceding stage turbine, the gas discharged from at least one of the compressors will directly reach downstream of the suction port of the preceding stage turbine through the split flow pipe, that is, the downstream of the preceding stage heater, which reduces a mass flow of the gas entering into the preceding stage heater. Since the preceding stage heater is arranged in a boiler furnace and a wall surface heating manner using a cooling wall is employed, a boiler resistance is effectively reduced and a boiler pressure drop is reduced by reducing the mass flow of the gas entering into the preceding stage heater.

In addition, in the supercritical $CO_2$ cycle system of the coal-fired power generation system, the mass flow of the gas entering into the preceding stage heater is reduced, which effectively reduces the difficulty of arranging a cooling wall heating surface in a boiler. Moreover, a thickness of a pipe wall of the cooling wall in the boiler can also be reduced, thereby reducing a temperature of an outer wall of the boiler, which is conducive to the safe operation of the boiler.

In the turbine unit, the communication position between the split flow pipe P1 and the turbine unit may be located at one of multiple positions downstream of the suction port of the preceding stage turbine T1, for example, the communication position may be located between the preceding stage turbine T1 and the last stage turbine T2, or the communication position may be located at an intermediate stage expansion inlet of the preceding stage turbine T1 in a case that the preceding stage turbine T1 is a multi-stage expansion turbine with three or more stages of expansion, or the communication position may be located at an intermediate stage expansion inlet of the last stage turbine T2 in a case that the last stage turbine T2 is a multi-stage expansion turbine with three or more stages of expansion.

In the supercritical $CO_2$ cycle system of the coal-fired power generation system, by selecting a specific position for the communication position between the split flow pipe P1 and the turbine unit, a pressure of the gas discharged by the compressor which is in communication with the turbine unit through the split flow pipe P1 can be adjusted.

In a case that the preceding stage turbine T1 is a multi-stage expansion turbine with three or more stages of expansion, the communication position between the split flow pipe P1 and the turbine unit may be located at an intermediate stage expansion inlet of the preceding stage turbine T1. Specifically, if the preceding stage turbine T1 is a three-stage expansion turbine, the preceding stage turbine T1 has a low stage expansion inlet, an intermediate stage expansion inlet and a high stage expansion inlet. In this case, the low stage expansion inlet is the suction port of the preceding stage turbine T1, and the number of the intermediate stage expansion inlet is one. If the preceding stage turbine T1 is a multi-stage expansion turbine with four or more stages of expansion, the preceding stage turbine T1 has a low stage expansion inlet, intermediate stage expansion inlets and a high stage expansion inlet. In this case, the low stage expansion inlet is the suction port of the preceding stage turbine T1, the number of the intermediate stage expansion inlets is at least two, and the communication position between the split flow pipe P1 and the turbine unit may be located at any one of the intermediate stage expansion inlets of the preceding stage turbine T1.

Accordingly, in a case that the last stage turbine T2 is a multi-stage expansion turbine with three or more stages of expansion, the communication position between the split flow pipe P1 and the turbine unit may be located at the intermediate stage expansion inlet of the last stage turbine T2. Specifically, if the last stage turbine T2 is a three-stage expansion turbine, the last stage turbine T2 has a low stage expansion inlet, the intermediate stage expansion inlet and a high stage expansion inlet. In this case, the low stage expansion inlet is a suction port of the last stage turbine T2, and the number of the intermediate stage expansion inlet is one. If the last stage turbine T2 is a multi-stage expansion turbine with four or more stages of expansion, the last stage turbine T2 has a low stage expansion inlet, intermediate stage expansion inlets and a high stage expansion inlet. In this case, the low stage expansion inlet is the suction port of the last stage turbine T2, the number of the intermediate stage expansion inlets is at least two, the communication position between the split flow pipe P1 and the turbine unit may be located at any one of the intermediate stage expansion inlets of the last stage turbine T2.

The communication position between the split flow pipe P1 and the turbine unit may also be located between the preceding stage turbine T1 and the last stage turbine T2. Specifically, as shown in FIG. 1, the preceding stage turbine T1 is in communication with the last stage heater H2 through a turbine pipe P2, and the split flow pipe P1 is in communication with the turbine pipe P2.

Certainly, the communication position between the split flow pipe P1 and the turbine unit may also be located at other positions between the preceding stage turbine T1 and the last stage turbine T2.

Specifically, as shown in FIGS. 2 and 3, the turbine unit further includes a plurality of intermediate stage heaters H4 and a plurality of intermediate stage turbines T3 connected in series between the preceding stage turbine T1 and the last stage heater H2, and each of the intermediate stage heaters H4 is arranged upstream of one of the plurality of intermediate stage turbines T3 which is adjacent to the intermediate stage heater H4.

For example, the preceding stage turbine T1 is in communication with the intermediate stage heater H4 adjacent to the preceding stage turbine T1 through a first turbine pipe section P21, and the last stage heater H2 is in communication with the intermediate stage turbine T3 adjacent to the last stage turbine H2 through a second turbine pipe section P22. The split flow pipe P1 is in communication with the first turbine pipe section P21 as shown in FIG. 2, or the split flow pipe P1 is in communication with the second turbine pipe section P22 as shown in FIG. 3.

In the above turbine unit, both the intermediate stage turbine T3 and the intermediate stage heater H4 may be one, or two or more. In order to reduce components, preferably, the intermediate stage turbine T3 is in a one-to-one correspondence with the intermediate stage heater H4. In a case that at least two intermediate stage turbines T3 and at least two intermediate stage heaters H4 are provided, each of the intermediate stage turbines T3 is in communication with the intermediate stage heater H4 adjacent thereto through a third turbine pipe section, and the split flow pipe P1 may be in communication with the third turbine pipe section.

The intermediate stage turbine T3 may be a multi-stage expansion turbine with three or more stages of expansion. Accordingly, the communication position between the split flow pipe P1 and the turbine unit may be located at an intermediate stage expansion inlet of the intermediate stage turbine T3. Specifically, if the intermediate stage turbine T3 is a three-stage expansion turbine, the intermediate stage turbine T3 has a low stage expansion inlet, the intermediate stage expansion inlet and a high stage expansion inlet. In this case, the low stage expansion inlet is a suction port of the intermediate stage turbine T3, and the number of the intermediate stage expansion inlet is one. If the intermediate stage turbine T3 is a multi-stage expansion turbine with four or more stages of expansion, the intermediate stage turbine T3 has a low stage expansion inlet, intermediate stage expansion inlets and a high stage expansion inlet. In this case, the low stage expansion inlet is the suction inlet of the intermediate stage turbine T3, the number of the intermediate stage expansion inlets is at least two, and the communication position between the split flow pipe P1 and the turbine unit may be located at any one of the intermediate stage expansion inlets of the intermediate stage turbine T3.

In the supercritical $CO_2$ cycle system of the coal-fired power generation system, a turbine exhaust pipe P3 is arranged at an exhaust port of the last stage turbine T2, and the suction port of the compressor of the compressor unit is in communication with the turbine exhaust pipe P3.

The number of the compressor in the compressor unit may be one or more. In a case that the compressor unit includes at least two compressors, the suction port of each of the compressors is in communication with the turbine exhaust pipe P3, and communication positions between the compressors and the turbine exhaust pipe P3 are successively distributed along a flow direction in the turbine exhaust pipe P3.

In an embodiment, in the flow direction in the turbine exhaust pipe P3, an exhaust port of the compressor located most upstream is in communication with the turbine unit through the split flow pipe P1.

Specifically, the compressor unit includes three compressors, namely, a preceding stage compressor C1, an intermediate stage compressor C2 and a last stage compressor C3. Along the flow direction in the turbine exhaust pipe P3, the preceding stage compressor C1 is located upstream of the intermediate stage compressor C2, and the intermediate stage compressor C2 is located upstream of the last stage compressor C3. In this case, preferably, an exhaust port of the preceding stage compressor C1 is in communication with the turbine unit through the split flow pipe P1, as shown in FIGS. 1 to 3.

Certainly, the compressor unit may also include four or more compressors, in this case, the number of the intermediate stage compressor C2 is two or more.

The compressor unit may include only two compressors, which are the preceding stage compressor C1 and the last stage compressor C3. Along the flow direction in the turbine exhaust pipe P3, the preceding stage compressor C1 is located upstream of the last stage compressor C3. In this case, preferably, the exhaust port of the preceding stage compressor C1 is in communication with the turbine unit through the split flow pipe P1.

In the supercritical $CO_2$ cycle system of the coal-fired power generation system, along the flow direction in the turbine exhaust pipe P3, the exhaust port of the compressor located most upstream is in communication with the turbine unit through the split flow pipe P1, which can effectively reduce a pressure of a gas discharged by the compressor located most upstream along the flow direction in the turbine exhaust pipe P3, thereby reducing the temperature of the exhaust gas.

The exhaust port of the last stage turbine T2 is provided with the turbine exhaust pipe P3. In order to simplify the structure, a low pressure side pipe section of the auxiliary regenerator AR is connected in series with the turbine exhaust pipe P3, and a high pressure side pipe section of the auxiliary regenerator AR is connected in series with the split flow pipe P1.

The supercritical $CO_2$ cycle system of the coal-fired power generation system further includes a turbine inlet pipe and a regenerative unit. Except for the compressor whose exhaust port is in communication with the turbine unit through the split flow pipe P1, the exhaust ports of other compressors are in communication with the turbine inlet pipe. The regenerative unit includes a plurality of regenerators, and low pressure side pipe sections of the regenerators are connected in series with the turbine exhaust pipe P3, and high pressure side pipe sections of the regenerators are connected in series with the turbine inlet pipe.

In order to reduce components, preferably, the auxiliary regenerator AR and one of the regenerators are configured to form an integral structure. Specifically, the regenerative unit includes three regenerators, namely, a high temperature regenerator HTR, a medium temperature regenerator MTR and a low temperature regenerator LTR. Along a flow direction in the turbine inlet pipe, the high temperature regenerator HTR is located downstream of the medium temperature regenerator MTR, and the medium temperature regenerator MTR is located downstream of the low temperature regenerator LTR. Along the flow direction in the turbine exhaust pipe P3, the high temperature regenerator HTR is located upstream of the medium temperature regenerator MTR, and the medium temperature regenerator MTR is located upstream of the low temperature regenerator LTR. In a case that the exhaust port of the preceding stage compressor C1 is in communication with the turbine unit through the split flow pipe P1, then preferably, the auxiliary regenerator AR and the high temperature regenerator HTR form an integral structure.

Figure 7:
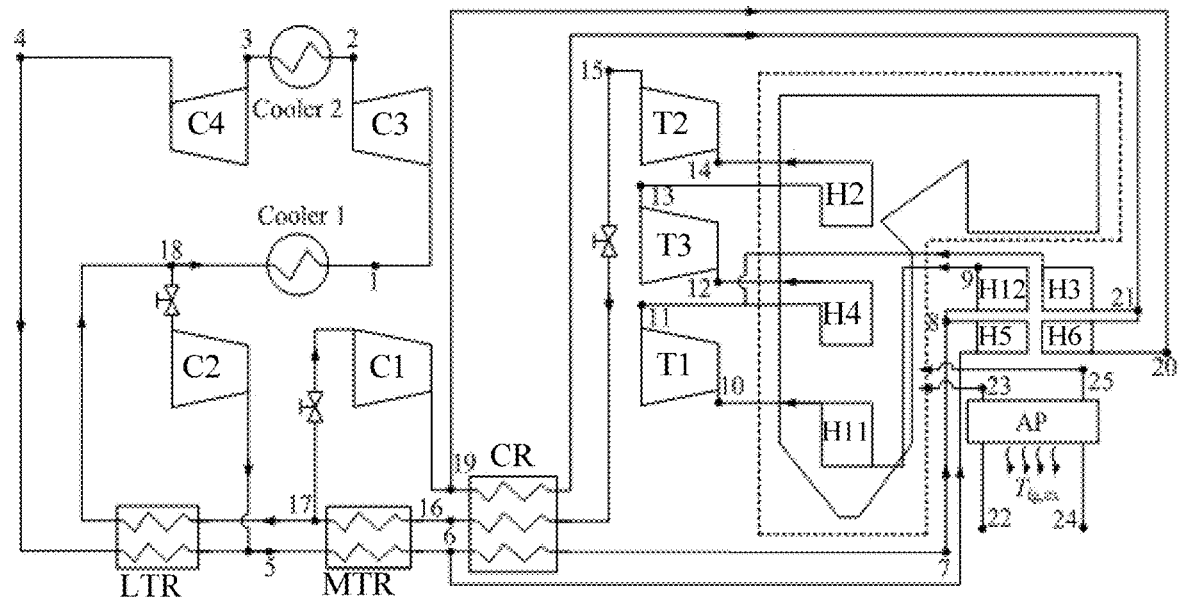
FIG. 7 is another flow chart of the coal-fired power generation system according to the embodiment of the present application.

It can be understood that, the auxiliary regenerator AR and the high temperature regenerator HTR share a housing and the low pressure side pipe section. Specifically, the auxiliary regenerator AR and the high temperature regenerator HTR form the integral structure, which is a combined regenerator CR, as shown in FIG. 7. The combined regenerator CR includes a housing, a low pressure side pipe section arranged in the housing, a first high pressure side pipe section arranged in the housing and a second high pressure side pipe section arranged in the housing. The first high pressure side pipe section is connected in series with the turbine inlet pipe, and the second high pressure side pipe section is connected in series with the split flow pipe P1. In this way, the structure of the combined regenerator is simplified and the cost is reduced.

Certainly, the combined regenerator may be other structures, which is not limited to the above solution.

In order to more specifically describe the present application, two embodiments are provided hereinafter.

FIRST EMBODIMENT

As shown in FIG. 1, the supercritical $CO_2$ cycle system of the coal-fired power generation system is a single reheat and three-stage compression cycle with partial compression at a last stage. A working medium is supercritical carbon dioxide.

Specifically, the working medium is split at a low pressure side outlet of the medium temperature regenerator MTR, part of the working medium enters into a low pressure side of the low temperature regenerator LTR, and another part of the working medium enters into the preceding stage compressor C1. The supercritical carbon dioxide entering into the low temperature regenerator LTR is further split at a low pressure side outlet of the low temperature regenerator LTR, wherein part of the working medium enters into a high pressure side of the low temperature regenerator LTR after successively entering into a first cooler and the last stage compressor C3, and another part enters into the intermediate stage compressor C2 to be compressed by the intermediate stage compressor C2, and then converges with the part of the working medium which comes from a high pressure side outlet of the low temperature regenerator LTR, to enter into the medium temperature regenerator MTR. The working medium flows out of the medium temperature regenerator MTR successively enters into the high temperature regenerator HTR, the preceding stage heater H1 and the preceding stage turbine T1. The another part of the working medium, which enters into the preceding stage compressor C1, is compressed by the preceding stage compressor C1 and enters into the auxiliary regeneration AR, and then enters into an auxiliary heater H3. The working medium heated by the auxiliary heater H3 converges with the working medium discharged from the preceding stage turbine T1, to enter into the last stage heater H2, and then enters into the last stage turbine T2. After passing through the last stage turbine T2, the working medium is split into two parts, and the two parts enter into the high temperature regenerator HTR and the auxiliary regenerator AR, respectively. A condition for splitting the flow is that adjacent sides between the high temperature regenerator HTR and the auxiliary regenerator AR have the same working medium, that is, a low pressure side of the high temperature regenerator HTR and a low pressure side of the auxiliary regenerator AR are adjacent to each other. The working medium flowing out of the high temperature regenerator HTR converges with the working medium flowing out of the auxiliary regenerator AR, and then enters into the medium temperature regenerator MTR, thus, a cycle of the working medium is completed.

A working medium pressure at an outlet of the preceding stage compressor C1 can be adjusted, and an exhaust port pressure of the preceding stage compressor C1 is different from an exhaust port pressure of the intermediate stage compressor C2, and the exhaust port pressure of the preceding stage compressor C1 is different from an exhaust port pressure of the last stage compressor C3, which changes the regenerative characteristics of the cycle. For the single reheat, the exhaust port pressure of the preceding stage compressor C1 may be similar to an exhaust port pressure of the preceding stage turbine T1.

In the above cycle, the working medium discharged from the preceding stage compressor C1 does not enter into the preceding stage heater H1, so a mass flow in the preceding stage heater H1 is reduced. Compared with a single reheat and three-stage compression cycle, the mass flow in the preceding stage heater H1 of the above cycle can be reduced by approximately 5%, and efficiency can be increased by 2%. Moreover, since the exhaust port pressure of the preceding stage compressor C1 is lower than that of the intermediate stage compressor C2 and the last stage compressor C3, an exhaust port temperature of the preceding stage compressor C1 is reduced, thus increasing a temperature area for residual heat absorption, which is more conducive to absorbing the residual heat.

It is beneficial to apply the above cycle to the coal-fired power generation. The reduction of the mass flow in the preceding heater H1 reduces the difficulty of arranging the heating surface of the cooling wall in the boiler, besides, the reduction of the exhaust port temperature of the preceding stage compressor C1 alleviates the problem of residual heat absorption in the tail flue.

SECOND EMBODIMENT

As shown in FIGS. 2 and 3, the supercritical $CO_2$ cycle system of the coal-fired power generation system is a double reheat and three-stage compression cycle with partial compression at a last stage. A working medium is supercritical carbon dioxide.

In order to highlight the advantages of the supercritical $CO_2$ cycle system of the coal-fired power generation system according to the embodiment of the present application, the double reheat and three-stage compression cycle with partial compression at the last stage shown in FIGS. 2 and 3 is compared with the double reheat recompression cycle in the conventional technology. Expect for a cycle process, turbine inlet parameters, cooler outlet parameters, isentropic efficiency of the compressor and isentropic efficiency of the turbine, and a pinch point of the regenerator of the double reheat and three-stage compression cycle with partial compression at the last stage are all the same as those of the double reheat recompression cycle. A sampling point is located between an outlet of the preceding stage heater H1 and the suction port of the preceding stage turbine T1, as shown in FIGS. 2 and 3.

To facilitate description, the double reheat and three-stage compression cycle with partial compression at the last stage is marked as P-TC+DRH, and the double reheat and recompression cycle is marked as RC+DRH.

Figure 4:
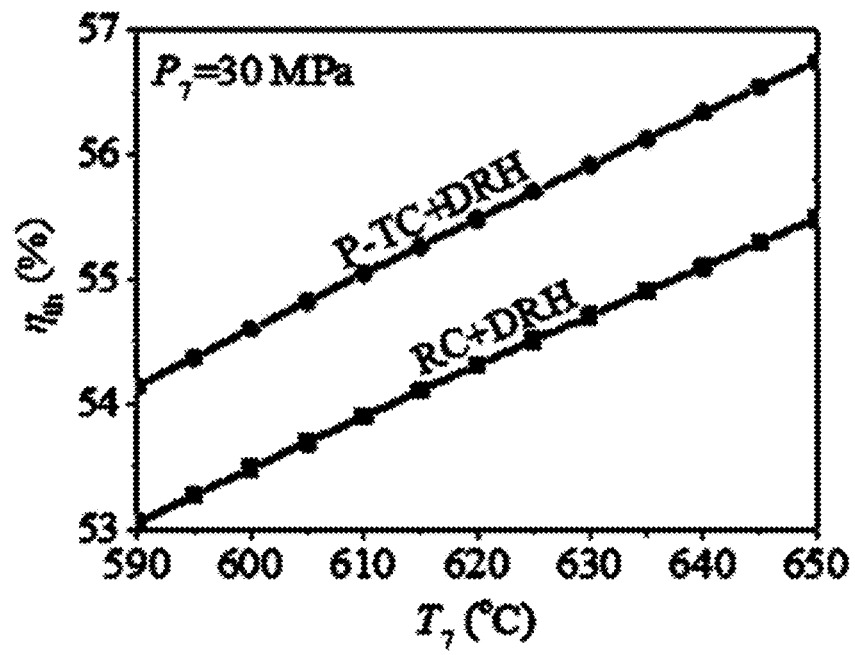
FIG. 4 is a comparison diagram of thermal efficiencies between the supercritical $CO_2$ cycle system of the coal-fired power generation system according to the embodiment of the present application and a double reheat and recompression cycle in the conventional technology.

Specifically, as shown in FIG. 4, compared with RC+DRH, the efficiency of P-TC+DRH is greatly improved. For example, when $T_7=620°$ C. and $P_7=30$ MPa, the thermal efficiency of RC+DRH is 54.31%, and the thermal efficiency of P-TC+DRH is 55.49%.

Figure 5:
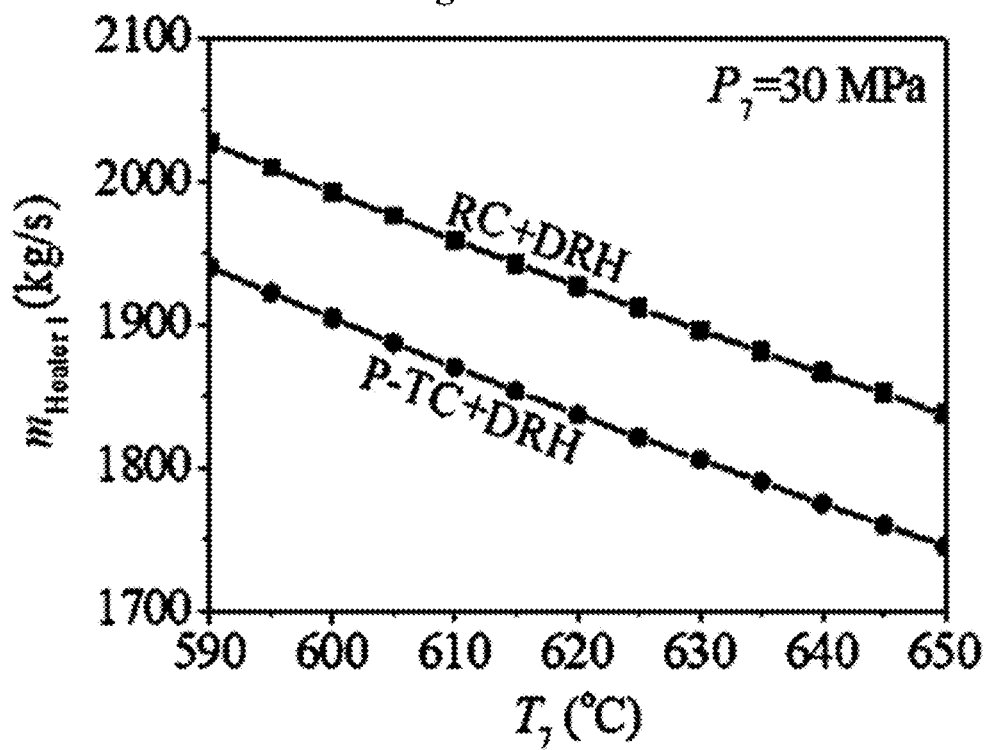
FIG. 5 is a comparison diagram of mass flows between the supercritical $CO_2$ cycle system of the coal-fired power generation system according to the embodiment of the present application and the double reheat and recompression cycle in the conventional technology.

Under the condition of an output power of 300 MWe, mass flows in the preceding stage heater H1 of the two cycles is shown as FIG. 5. It can be seen from FIG. 5 that, in P-TC+DRH, the mass flow in the preceding stage heater H1 is lower than that in RC+DRH, which reduces the difficulty in the design and manufacture of the supercritical $CO_2$ boiler.

In a case that the exhaust port pressure of the preceding stage compressor C1 of P-TC+DRH is close to the exhaust port pressure of the preceding stage turbine T1, the exhaust port temperature of the preceding stage compressor C1 reaches about 350° C., and in a case that the exhaust port pressure of the preceding stage compressor C1 is close to an exhaust port pressure of the last stage turbine T2, the exhaust port temperature of the preceding stage compressor C1 is about 300° C. Therefore, the employment of P-TC+DRH can effectively control a secondary air temperature in an air preheater, to allow the secondary air temperature to reach or get close to the secondary air temperature of the air preheater of ultra-supercritical units at present. Therefore, P-TC+DRH is an efficient cycle which is suitable for coal-fired power generation.

In the supercritical $CO_2$ cycle system of the coal-fired power generation system according to the present embodiment, the mass flow of the preceding stage heater H1 cycle is reduced by 5% compared with that of the recompression cycle, which greatly alleviates the problem of the design and manufacturing of the boiler caused by the large mass flow of the supercritical $CO_2$ cycle, and the cycle efficiency can be increased by 2%. In addition, the secondary air temperature can be maintained at about 320° C., and thus the difficulty in the design and manufacturing of the air preheater is reduced. When the single reheat is employed, the boiler structure is greatly simplified, and the solution is more feasible for engineering application.

Based on the supercritical $CO_2$ cycle system according to the above embodiments, a coal-fired power generation system is further provided. The coal-fired power generation system includes the supercritical $CO_2$ cycle system according to the above embodiments.

Since the supercritical $CO_2$ cycle system has the above technical effects, and the coal-fired power generation system includes the supercritical $CO_2$ cycle system, the coal-fired power generation system also has corresponding technical effects, which will not be repeated herein.

In the coal-fired power generation system, the preceding stage heater H1 includes a preceding stage heater body H11 and a main flue gas cooler H12. Along the medium flow direction in the turbine inlet pipe, the main flue gas cooler H12 is located upstream of the preceding stage heater body H11.

Specifically, in the coal-fired power generation system according to the present embodiment, the low pressure side pipe section of the auxiliary regenerator AR and the low pressure side pipe section of the high temperature regenerator HTR of the regenerative unit are arranged in parallel. In order to meet the requirements of using the regenerator, in FIG. 6, a pressure and a temperature of a reference point 16 are the same as those of a reference point 6. In FIG. 7, a pressure and a temperature of a reference point 19 are the same as those of a reference point 6.

Figure 6:
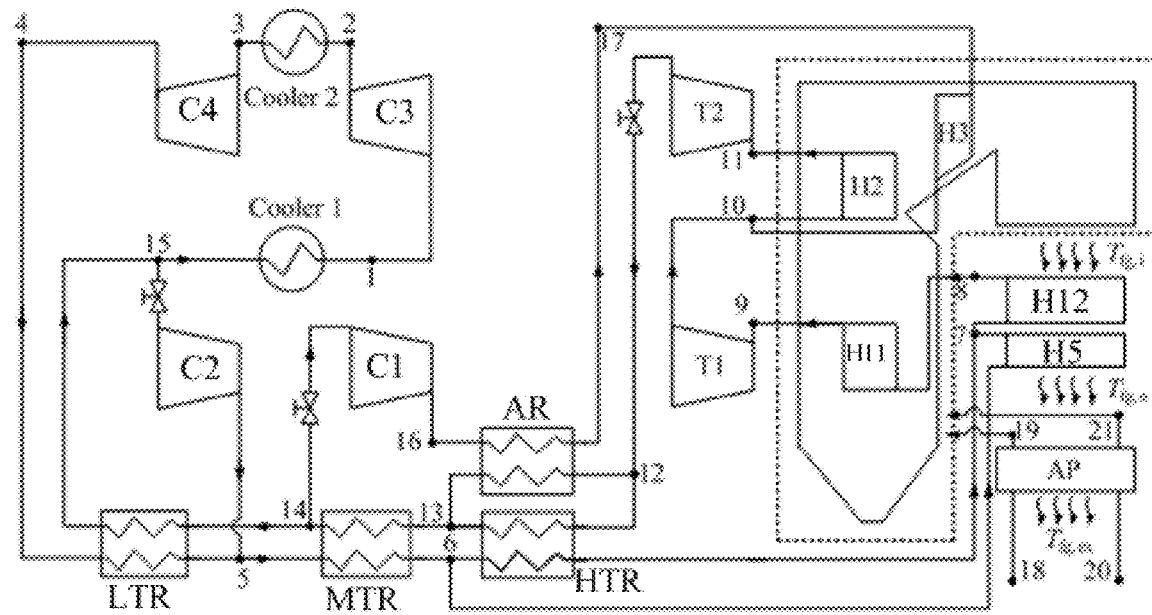
FIG. 6 is a flow chart of a coal-fired power generation system according to an embodiment of the present application.

As shown in FIG. 6, the coal-fired power generation system further includes a flue gas device, and the flue gas device includes the main flue gas cooler H12 and a first auxiliary flue gas cooler H5. An inlet of the first auxiliary flue gas cooler H5 is in communication with the high pressure side inlet of the high temperature regenerator HTR of the regenerative unit, and an outlet of the first auxiliary flue gas cooler H5 is in communication with an inlet of the main flue gas cooler H12.

The exhaust port of the preceding stage compressor C1 is in communication with the turbine unit, which reduces the temperature and the pressure at the reference point 16, thereby reducing the pressure and temperature of the reference point 6, that is, an inlet temperature of the first auxiliary flue gas cooler H5 is reduced, which enlarges the temperature area for residual heat absorption in the tail flue of the boiler, which is more conducive to the absorption of residual heat, thus improving the boiler efficiency, and thereby improving the total efficiency of the thermal system.

As shown in FIG. 7, the flue gas device includes the main flue gas cooler H12, a second auxiliary flue gas cooler H6 and the auxiliary heater H3. An inlet of the second auxiliary flue gas cooler H6 is in communication with the split flow pipe P1, and the communication position therebetween is located upstream of the auxiliary regenerator AR. An outlet of the second auxiliary flue gas cooler H6 is in communication with an inlet of the auxiliary heater H3.

The exhaust port of the preceding stage compressor C1 is in communication with the turbine unit, which reduces the temperature and the pressure at the reference point 19, thereby reducing the pressure and temperature of the reference point 6, that is, an inlet temperature of the second auxiliary flue gas cooler H6 is reduced, which enlarges the temperature area for residual heat absorption in the tail flue of the boiler, which is more conducive to the absorption of residual heat, thus improving the boiler efficiency, and thereby improving the total efficiency of the thermal system.

The flue gas device may further include the first auxiliary flue gas cooler H5 as shown in FIG. 7. The inlet of the first auxiliary flue gas cooler H5 is in communication with the high pressure side inlet of the high temperature regenerator HTR of the regenerative unit, and the outlet of the first auxiliary flue gas cooler H5 is in communication with the inlet of the main flue gas cooler H12.

Specifically, a high pressure side outlet of the high temperature regenerator HTR is in communication with the inlet of the main flue gas cooler H12, and the outlet of the main flue gas cooler H12 is in communication with the inlet of the preceding stage heater H1.

The coal-fired power generation system shown in FIG. 6 is a single intercooling, single reheat and three-stage compression cycle with partial compression at the last stage, which is marked as P-TC+RH+IC. State parameters of reference points in P-TC+RH+IC are shown in Table 1, and loads and mass flows of components in P-TC+RH+IC are shown in Table 2.

TABLE 1

State parameters of reference points in P – TC + RH + IC

| Reference point | Temperature T (° C.) | Pressure P (MPa) |
|---|---|---|
| 1 | 32.00 | 7.60 |
| 2 | 40.46 | 9.80 |
| 3 | 32.00 | 9.70 |
| 4 | 60.02 | 30.65 |
| 5 | 203.45 | 30.55 |
| 6 | 295.01 | 30.50 |
| 7 | 525.20 | 30.40 |
| 8 | 531.35 | 30.35 |
| 9 | 620.00 | 30.00 |
| 10 | 531.35 | 15.49 |
| 11 | 620.00 | 15.29 |
| 12 | 535.18 | 8.00 |
| 13 | 305.01 | 7.90 |
| 14 | 213.45 | 7.80 |
| 15 | 72.00 | 7.70 |
| 16 | 295.01 | 15.79 |
| 17 | 517.10 | 15.69 |
| 18 | 31.00 | — |
| 19 | 320.00 | — |
| 20 | 23.00 | — |
| 21 | 317.65 | — |
| $T_{fg, i}$ | 583.07 | — |
| $T_{fg, o}$ | 373.58 | — |
| $T_{fg, ex}$ | 123.00 | — |

TABLE 2

Loads and mass flows of components in P – TC + RH + IC

| Component | Load (MW) | Mass flow (t/h) |
|---|---|---|
| H11 (8-9) | 221.87 | 7082.64 |
| H2 (10-11) | 268.77 | 8840.63 |
| H3 (10-17) | 8.59 | 1757.99 |
| H12 (7-8) | 15.32 | 7082.64 |
| H5 (6-7) | 51.54 | 630.35 |
| T1 (9-10) | 201.03 | 7082.64 |
| T2 (11-12) | 241.10 | 8840.63 |
| C3 (1-2) | 5.46 | 4629.73 |
| C4 (3-4) | 37.95 | 4629.73 |

TABLE 2-continued

Loads and mass flows of components in P − TC + RH + IC

| Component | Load (MW) | Mass flow (t/h) |
|---|---|---|
| C2 (15-5) | 62.47 | 2452.91 |
| C1 (14-16) | 36.24 | 1757.99 |
| AR (12-13) | 130.97 | 1757.99 |
| AR (16-17) | 130.97 | 1757.99 |
| HTR (12-13) | 527.64 | 7082.64 |
| HTR (6-7) | 527.64 | 6452.28 |
| MTR (13-14) | 253.12 | 8840.63 |
| MTR (5-6) | 253.12 | 7082.64 |
| LTR (14-15) | 340.54 | 7082.64 |
| LTR (4-5) | 340.54 | 4629.73 |
| Cooler 1 (15-1) | 215.31 | 4629.73 |
| Cooler 2 (2-3) | 50.73 | 4629.73 |

The thermal efficiency of P-TC+RH+IC is 52.99%, and the boiler efficiency of P-TC+RH+IC is 94.43%.

It should be noted that, in Table 2, H11 (8-9) refers to H11 between a reference point 8 and a reference point 9; AR (12-13) refers to AR between a reference point 12 and a reference point 13; AR (16-17) refers to AR between a reference point 16 and a reference point 17. The understanding of the components in the component column in Table 2 can be referred to the above explanation of H11 (8-9), AR (12-13) and AR (16-17), which will not be explained in detail herein.

It can be understood that, the "_____" in Table 1 indicates that there is no value.

The coal-fired power generation system shown in FIG. 7 is a single intercooling, double reheat and three-stage compression cycle with partial compression at the last stage, which is marked as P-TC+DRH+IC. In the coal-fired power generation system, the auxiliary regenerator is and the high temperature regenerator form an integral structure, that is, a combined regenerator CR. There are 25 reference points in FIG. 7. The state parameters at reference points 1 to 25 in FIG. 7 are determined according to the actual operation conditions, which are not described and limited herein.

Based on the above description of the disclosed embodiments, those skilled in the art are capable of carrying out or using the present application. It is obvious for those skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A supercritical $CO_2$ cycle system of a coal-fired power generation system, comprising:
   a compressor unit and a turbine unit; wherein
   the turbine unit comprises a preceding stage heater, a preceding stage turbine, a last stage heater and a last stage turbine successively connected in series, an exhaust port of at least one of a plurality of compressors in the compressor unit is in communication with the turbine unit through a split flow pipe, and a communication position between the split flow pipe and the turbine unit is located downstream of a suction port of the preceding stage turbine; and
   an auxiliary regenerator and an auxiliary heater are provided on the split flow pipe, and the auxiliary regenerator is located upstream of the auxiliary heater.

2. The supercritical $CO_2$ cycle system according to claim 1, wherein the communication position between the split flow pipe and the turbine unit is located at an intermediate stage expansion inlet of the preceding stage turbine.

3. The supercritical $CO_2$ cycle system according to claim 1, wherein the preceding stage turbine is in communication with the last stage heater through a turbine pipe, and the split flow pipe is in communication with the turbine pipe.

4. The supercritical $CO_2$ cycle system according to claim 1, wherein the turbine unit further comprises a plurality of intermediate stage heaters and a plurality of intermediate stage turbines connected in series between the preceding stage turbine and the last stage heater, and each of the intermediate stage heaters is arranged upstream of one of the plurality of intermediate stage turbines which is adjacent to the intermediate stage heater.

5. The supercritical $CO_2$ cycle system according to claim 4, wherein the preceding stage turbine is in communication with one of the plurality of intermediate stage heaters which is adjacent to the preceding stage turbine through a first turbine pipe section, and the last stage heater is in communication with one of the plurality of intermediate stage turbines which is adjacent to the last stage heater through a second turbine pipe section; and
   the split flow pipe is in communication with the first turbine pipe section, or the split flow pipe is in communication with the second turbine pipe section.

6. The supercritical $CO_2$ cycle system according to claim 4, wherein the communication position between the split flow pipe and the turbine unit is located at an intermediate stage expansion inlet of one of the plurality of intermediate stage turbines.

7. The supercritical $CO_2$ cycle system according to claim 4, wherein at least two intermediate stage turbines and two intermediate stage heaters are provided, each of the intermediate stage turbines is in communication with one of the plurality of intermediate stage heaters which is adjacent to the intermediate stage turbine through a portion of a third turbine pipe section, and the split flow pipe is in communication with the third turbine pipe section.

8. The supercritical $CO_2$ cycle system according to claim 1, wherein a turbine exhaust pipe is arranged at an exhaust port of the last stage turbine, the compressor unit comprises at least two compressors in communication with the turbine exhaust pipe, and in a flow direction in the turbine exhaust pipe, an exhaust port of one of the compressors which is located most upstream is in communication with the turbine unit through the split flow pipe.

9. The supercritical $CO_2$ cycle system according to claim 1, wherein a turbine exhaust pipe is arranged at an exhaust port of the last stage turbine, a low pressure side pipe section of the auxiliary regenerator is connected in series with the turbine exhaust pipe, and a high pressure side pipe section of the auxiliary regenerator is connected in series with the split flow pipe.

10. The supercritical $CO_2$ cycle system according to claim 1, further comprising:
    a regenerative unit, wherein
    the regenerative unit comprises a plurality of regenerators, and the auxiliary regenerator and one of the plurality of regenerators are configured to form an integral structure.

11. A coal-fired power generation system, comprising the supercritical $CO_2$ cycle system according to claim 1.

12. The coal-fired power generation system according to claim 11, wherein a low pressure side pipe section of the auxiliary regenerator is arranged in parallel with a low pressure side pipe section of a high temperature regenerator of a regenerative unit;

the preceding stage heater comprises a preceding stage heater body and a main flue gas cooler; in a flow direction in a turbine inlet pipe, the main flue gas cooler is located upstream of the preceding stage heater body; and the coal-fired power generation system comprises a flue gas device, and the flue gas device comprises the main flue gas cooler; wherein the flue gas device further comprises a first auxiliary flue gas cooler, wherein an inlet of the first auxiliary flue gas cooler is in communication with a high pressure side inlet of the high temperature regenerator of the regenerative unit, and an outlet of the first auxiliary flue gas cooler is in communication with an inlet of the main flue gas cooler; and/or, the flue gas device further comprises a second auxiliary flue gas cooler and the auxiliary heater, wherein an inlet of the second auxiliary flue gas cooler is in communication with the split flow pipe at a position located upstream of the auxiliary regenerator, and an outlet of the second auxiliary flue gas cooler is in communication with an inlet of the auxiliary heater.

13. A coal-fired power generation system, comprising the supercritical $CO_2$ cycle system according to claim 2.

14. A coal-fired power generation system, comprising the supercritical $CO_2$ cycle system according to claim 3.

15. A coal-fired power generation system, comprising the supercritical $CO_2$ cycle system according to claim 4.

16. A coal-fired power generation system, comprising the supercritical $CO_2$ cycle system according to claim 5.

17. A coal-fired power generation system, comprising the supercritical $CO_2$ cycle system according to claim 6.

18. A coal-fired power generation system, comprising the supercritical $CO_2$ cycle system according to claim 7.

19. A coal-fired power generation system, comprising the supercritical $CO_2$ cycle system according to claim 8.

20. A coal-fired power generation system, comprising the supercritical $CO_2$ cycle system according to claim 9.

* * * * *